United States Patent [19]

Wallis

[11] Patent Number: 4,595,135

[45] Date of Patent: Jun. 17, 1986

[54] METHOD AND APPARATUS FOR FORMING HEAT EXCHANGER TUBES

[76] Inventor: Bernard J. Wallis, 25315 Kean Ave., Dearborn, Mich. 48124

[21] Appl. No.: 639,131

[22] Filed: Aug. 9, 1984

[51] Int. Cl.$^4$ ............................................. B23K 31/06
[52] U.S. Cl. ........................................ 228/17; 72/181
[58] Field of Search ................. 228/17, 142, 144, 146, 228/149, 150, 151, 158; 72/52, 181, 178, 365, 366, 367, 369

[56] References Cited

U.S. PATENT DOCUMENTS

| | | | |
|---|---|---|---|
| 1,420,042 | 6/1922 | Kritz | 72/181 |
| 2,821,772 | 2/1958 | Billetter | 228/151 |
| 3,452,424 | 7/1969 | Morris | 228/17 |
| 3,755,884 | 9/1973 | Dupy | 228/151 |
| 4,142,663 | 3/1979 | Blatnik | 228/17 |

Primary Examiner—Nicholas P. Godici
Assistant Examiner—M. Jordan
Attorney, Agent, or Firm—Barnes Kisselle Raisch Choate Whittemore & Hulbert

[57] ABSTRACT

A tube mill for forming heat exchanger coolant tubes has a series of form rolls for rolling flat strip stock into a flat-sided tube with rounded longitudinal free edge portions. After rolling, the free edge portions are heated to a fusion temperature and pressed together between a pair of squeeze rolls to form a weld seam therebetween. The heating is performed by a high frequency induction coil which encircles both the tube and a guide for the free edge portions. The guide is located immediately upstream from the squeeze rolls.

11 Claims, 23 Drawing Figures

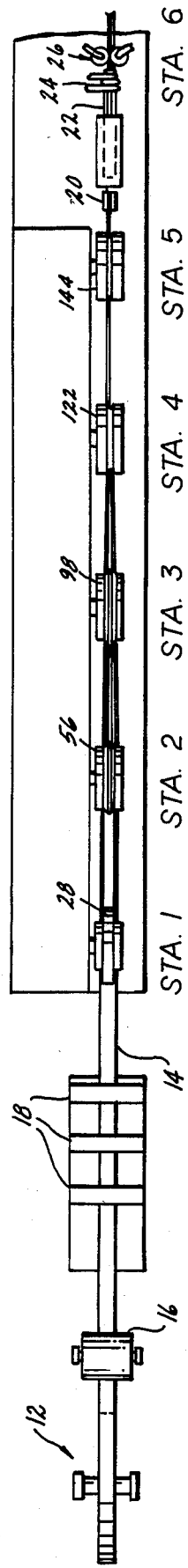

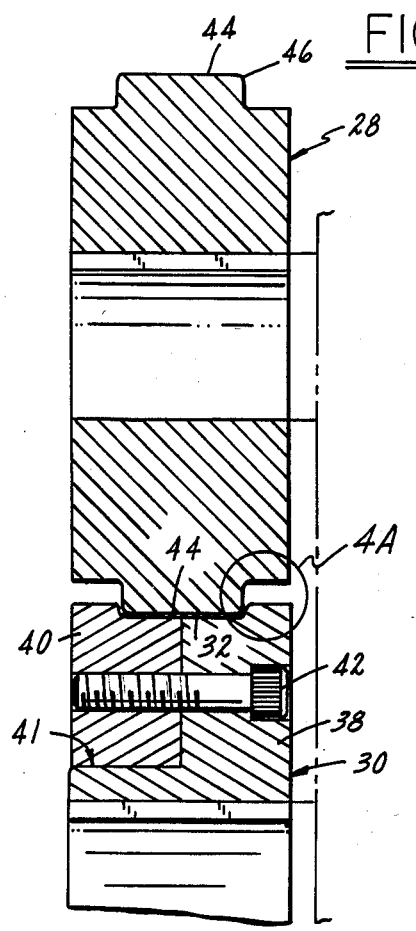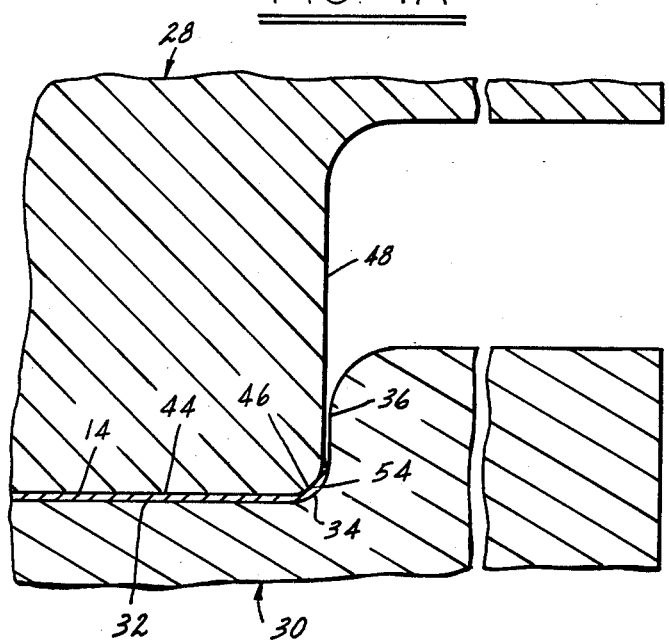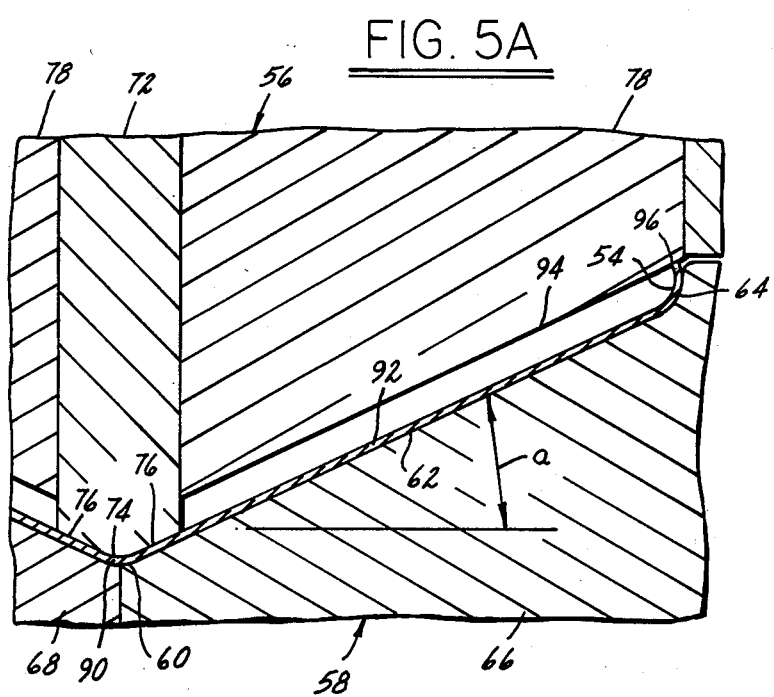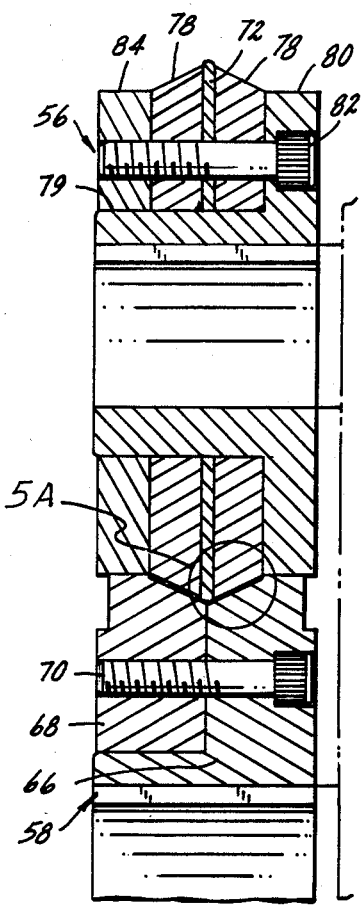

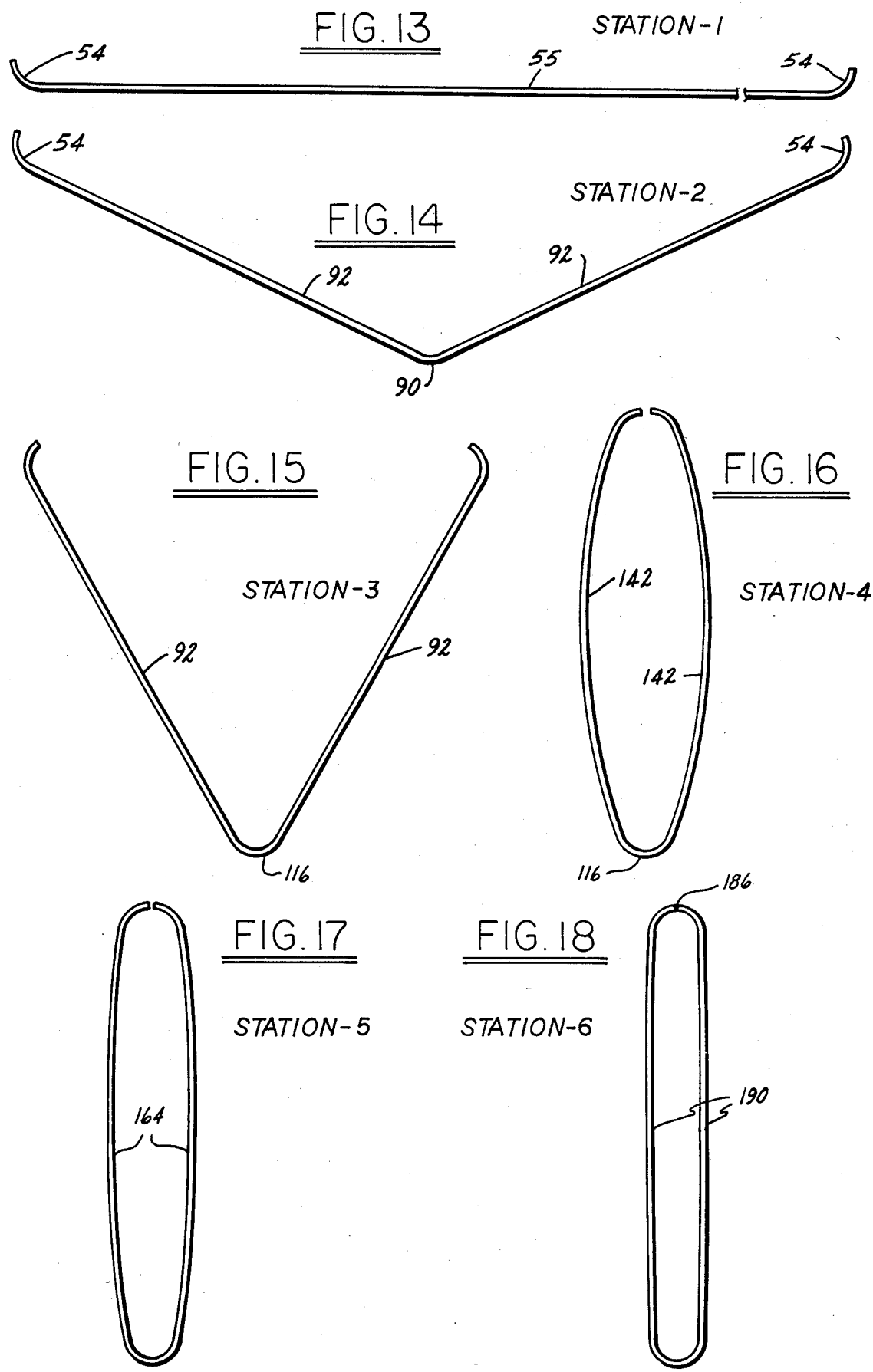

METHOD AND APPARATUS FOR FORMING HEAT EXCHANGER TUBES

This invention relates to a method and apparatus for forming tubes from sheet metal and, more particularly, for forming flat coolant tubes for heat exchangers.

Coolant tubes for heat exchangers have generally flat side walls connected by rounded bight portions along their opposite longitudinal edges. In a heat exchanger the tubes are arranged interdigitally with corrugated fin strips with the side walls soldered to the successive crests of the fin strips. Such tubes are usually rolled from flat strip stock into tubes of circular cross section which are butt welded along their abutting edges and then flattened into the desired finished shape. This method of forming such tubes has several inherent disadvantages. When the strip stock is rolled into circular shape and then flattened, the metal is subjected to considerable cold working which can result in defects such as cracks in the finished tube. In addition, the strip stock from which such tubes are rolled frequently has a thickness of less than 0.010"; consequently, prior to welding the rolled tube is quite flimsy and flexible and it is very difficult to exactly align the edges in opposed abutting relation for welding.

The primary object of this invention is to provide a method and apparatus for rolling flat metal strip stock into generally flat tubes at a high rate of speed and in a manner which reduces cold working of the metal to a minimum.

A further object of the invention is to provide a tube mill wherein the strip stock is bent along an extremely accurate center line which is thereafter utilized to center the strip as it is directed through the successive forming rolls.

Another object of the invention is to provide a guide mechanism which engages each of the opposed free edges of the strip on laterally opposite sides thereof to maintain them in perfect alignment as the strip is directed through the welding station.

More specifically, in accordance with the present invention flat strip stock is rolled into a flat tube while maintaining the side walls of the tube in a generally flat condition throughout the rolling operation. As a result, the metal is subjected to a minimum of cold working. Furthermore, since the side walls of the tube are maintained substantially flat, the cross section of the tube prior to welding presents a relatively rigid structure as compared to a circular cross section. Thus the operation of exactly aligning the opposed free edges for welding is rendered relatively simple.

In general the rolling of flat strip stock into a flat tube in accordance with the present invention involves the steps of first rolling the opposite edges of the strip into a curved configuration having a radius corresponding to the radius of curvature desired on the rounded longitudinally welded edge of the tube, then progressively rolling the central portion of the strip into the rounded configuration desired along the other longitudinal edge of the tube while utilizing the rounded free edge portions and the center bend to accurately center the strip as it advances through the successive forming rolls and, thereafter heating the spaced free edges of the rolled strip to a temperature at which they are adapted to be fused together and directing them through a guide located upstream from and directly adjacent a pair of squeeze rolls for effecting a weld seam therebetween, the guide being designed to engage each free edge portion of the strip on laterally opposite sides thereof.

Other objects, features and advantages of the present invention will become apparent from the following description and accompanying drawings, in which:

FIGS. 1 and 2 are plan and side elevational views, respectively, of a tube mill according to the present invention;

FIG. 3 is a sectional view along the line 3—3 in FIG. 2;

FIG. 4 is a sectional view along the line 4—4 in FIG. 2;

FIG. 4A is an enlarged fragmentary sectional view of the portion of FIG. 4 designated 4A;

FIG. 5 is a sectional view taken along the line 5—5 in FIG. 2;

FIG. 5A is a fragmentary enlarged sectional view of the portion of FIG. 5 designated 5A;

FIG. 12 is a sectional view along the line 12—12 in FIG. 2; and

Figure 6:
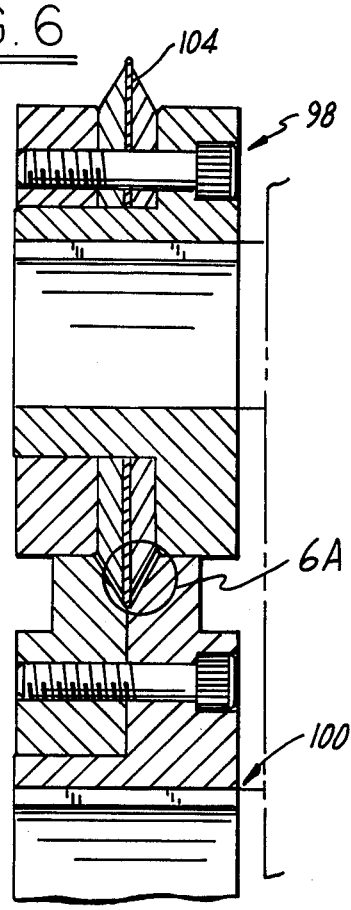
FIG. 6 is a sectional view taken along the line 6—6 in FIG. 2.

FIGS. 13 thru 18 show the progressive cross sectional configuration of the strip stock as it is formed into the finished tube.

The tube mill is generally designated 10 in FIGS. 1 and 2 and includes a reel 12 of flat strip stock from which the flattened tube is rolled. The strip stock on reel 12 is of extremely accurate uniform width with squared longitudinal edges. The strip 14 from reel 12 is initially directed around a guide roller 16 and then through a plurality of accurately machined guides 18 for aligning the strip in an accurately straight path. The strip is then directed through a plurality of sets of cooperating form rolls which, in FIG. 1, are designated stations 1, 2, 3, 4 and 5. After the strip emerges from the form rolls at station 5 it is guided by a pair of vertically spaced guide rolls 20 through a guide member 22, an induction heating coil 24 and then between a pair of squeeze rolls 26.

The form rolls at station 1 are illustrated in FIGS. 4 and 4A. The rolls comprise an upper roll 28 and a lower roll 30. Lower roll 30 has a central circular cylindrical portion 32 of uniform radius which is centered laterally with respect to the strip directed through the guides 18. At laterally opposite ends thereof the central portion 32 has a radially outwardly curved fillet 34 which merges with a radial shoulder 36. To facilitate the manufacture thereof the lower roll 30 is formed as two separate rings 38,40 which are secured together as by screws 42. Accurate alignment of the two rings is assured by seating ring 40 on the cylindrical flange 41 of ring 38.

The upper roll 28 at station 1 also has a circular cylindrical central portion 44 which, at its laterally opposite ends, has rounded corners 46 which merge smoothly with radially inwardly extending shoulders 48.

Rolls 28,30 are keyed to driven shafts 50,52 which are spaced vertically apart. These rolls are arranged in mating relation as shown in FIGS. 4 and and 4A so that the central portion 32 of roll 30 registers axially with the central portion 44 of roll 28 and is spaced therefrom a distance corresponding to the thickness of strip 14. The rounded corners 46 of roll 28 are spaced from and concentric with the rounded fillets 34 on roll 30. The radii of the fillets 34 and the rounded corners 46 are determined such that, when the strip is directed between rolls 28,30, the laterally outer edge portions 54 of strip 14 are bent to the curved configuration desired along the edge of the finished tube which is subsequently seam welded. Thus, as the strip 14 emerges from between rolls 28,30, it has a flat central portion 55 with upwardly rounded edge portions 54 along the laterally opposite sides thereof as shown in FIG. 13.

The rolls at station 2 are illustrated in FIGS. 5 and 5A, the upper roll being designated 56 and the lower roll being designated 58. The lower roll 58 is formed around its periphery with a V-shaped groove having an accurately centered rounded apex 60 from which extend a pair of radially outwardly flaring conical surfaces 62 which terminate at their outer ends in radially outwardly curved shoulders 64. The radius of curvature of shoulders 64 corresponds to the radius of curvature imparted to the laterally outer edge portions 54 of strip 14 by rolls 28,30. For ease of manufacture, the lower roll 58 is formed as two separate rings 66,68 assembled together by screws 70 in a manner similar to rings 38,40.

The upper roll 56 comprises a central annular disc 72, the outer periphery of which has a generally V-shaped configuration in cross section defined by an accurately centered rounded portion or apex 74 merging on opposite sides thereof with conical surfaces 76. At each side of the central disc 72 the upper roll 56 has a segment 78, the outer peripheral surface of which flares radially inwardly and is spaced radially inwardly from the outer periphery of disc 72. Disc 72 and segments 78 are formed as rings and are mounted concentrically on the cylindrical flange 79 of an annular member 80. They are clamped together by screws 82 and an additional ring 84.

Rolls 56,58 are keyed to parallel driven shafts 86,88 which are spaced apart in vertical alignment. The two rolls are dimensioned and spaced apart such that, when the formed strip that emerges from between rolls 28,30 is directed through between rolls 56,58, the strip is bent into a V-shaped configuration (FIG. 14) having an accurately centered rounded apex 90 formed between the curved apices 60,74, flat legs 92 and the upwardly and inwardly curved outer edge portions 54. It will be observed that the strip is centered accurately in an axial direction between rolls 56,58 by the rounded shoulders 64 on roll 58 which engage the laterally outer surfaces of the rounded edges 54 of the strip. Also, as shown in FIG. 5A, the conical peripheral surfaces 94 of segments 78 are merely in rolling contacting relation with the extreme free edges 96 of the curved edge portions 54 of the strip. The angle a at which the legs 92 of the strip are inclined upwardly toward each other preferably lies in the range of about 25° to 30°.

Figure 6A:
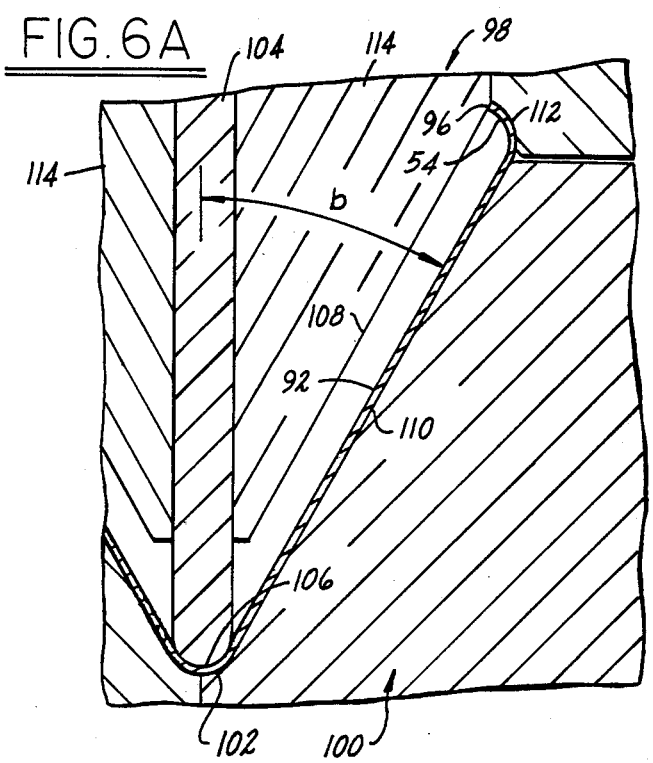
FIG. 6A is a fragmentary enlarged sectional view of the portion of FIG. 6 designated 6A.

The rolls at station 3 are shown in FIGS. 6 and 6a, the upper roll being designated 98 and the lower roll being designated 100. The ring construction and assembly of these two rolls is generally the same as rolls 56, 58. The difference lies primarily in the fact that the central apex 102 of the V-shaped groove on roll 100 has the same radius, but a greater circumferential extent than the rounded apex 60 on roll 58 and the outer periphery of the central disc 104 on roll 98 is defined in cross section by a circular arc 106 having a circumferential extent of about 180°. Likewise, the conical surfaces 108,110 on rolls 98,100 are inclined to the vertical at a steeper angle b than the previous pair of rolls so that the included angle between these legs is substantially less than the included angle as the strip emerges from rolls 86,88. In addition, it will be noted that the strip is accurately centered laterally between the rolls not only by the interengagement of the accurately centered apex 90 with the accurately centered portions 102,106 of rolls 100,98, but also by rounded shoulders 112 on the upper roll 98 which engage the laterally outer surfaces of the rounded edge portions 54 of the strip. Here again, the conical surfaces 108 of the roll segments 114 are merely in rolling contact with the extreme free edges 96 of the curved edge portions 54 at laterally opposite sides of the strip.

In comparing FIG. 14 with FIG. 15 it is apparent that the configuration of the strip imparted by rolls 98,100 merely involves an increase in the circumferential extent of the rounded apex 116 of the V-shaped configuration of the strip so that the included angle between the two flat legs 92 has been reduced substantially. The angle b shown in FIG. 6A preferably lies in the range of between 25° to 30°. Rolls 98,100 are keyed to driven shafts 118,120. These shafts are spaced vertically apart on parallel axes.

Figure 7A:
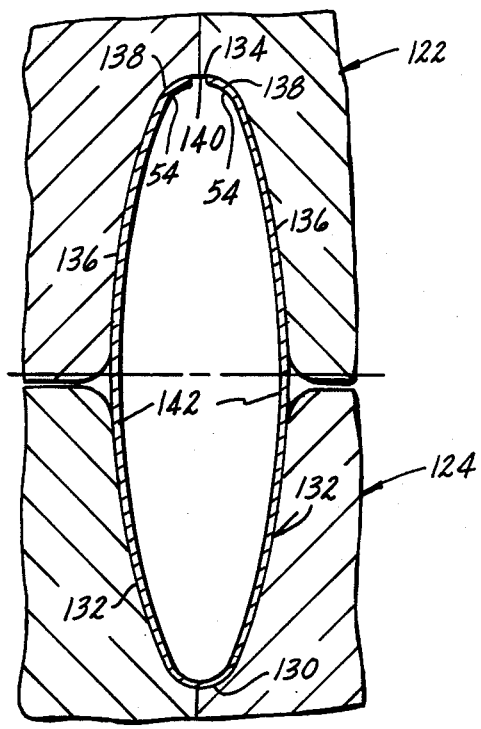
FIG. 7A is a fragmentary enlarged sectional view of the portion of FIG. 7 designated 7A.
Figure 7:
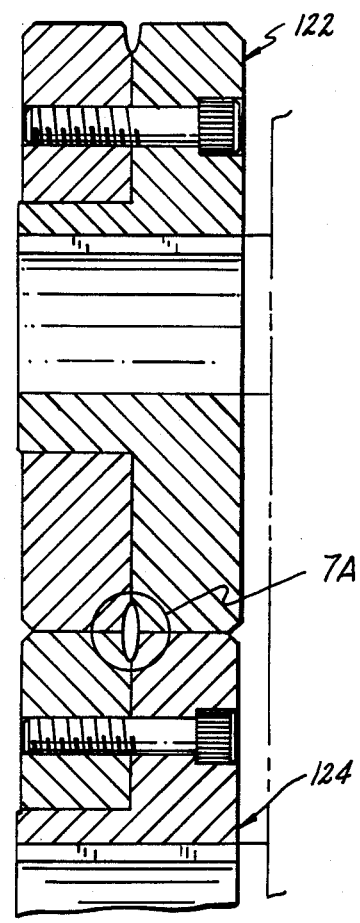
FIG. 7 is a sectional view taken along the line 7—7 in FIG. 2.

The form rolls at station 4 of the mill are illustrated in FIGS. 7 and 7A, the upper roll being designated 122 and the lower roll being designated 124. As in the case of the previously described form rolls, rolls 122,124 are keyed to driven shafts 126,128 which are spaced vertically apart in parallel relation. Likewise, the ring-type construction of rolls 122,124 is similar to roll 30 at station 1. The lower roll 124 has a central V-shaped groove around its outer periphery defined by an accurately centered rounded apex and slightly curved side walls 132. The upper roll 122 is likewise formed with a V-shaped groove around its outer periphery which is defined by an accurately centered rounded apex 134 and slightly curved side walls 136. The apex 134 differs slightly in configuration from the apex 130 in that the apex 130 is a continuous curve having a predetermined radius corresponding to the radius desired of the bight portion of the finished tube opposite the welded edges. On the other hand, the apex 134 on roll 122 comprises two curved sections 138 having a radius corresponding to the radius of apex 130 separated by a central cylindrical portion 140 of uniform radius. The depth of the grooves in rolls 122,124 is such that, as the formed strip is directed between these rolls, it is compressed in a direction radially of the rolls so that the flat side walls 92 of the strip are previously formed are caused to bulge outwardly into contact with the curved surfaces 132,136 of the rolls and the circumferential extent of the rounded apex 116 is increased so that the now slightly curved side walls 142 of the tube are spaced much closer together as shown in FIG. 16. It will be noted that although the configuration of the curved edge portions 54 is not altered, the extreme free edges of these curved portions are still spaced apart slightly after the formed strip emerges from rolls 122,124.

Figure 8:
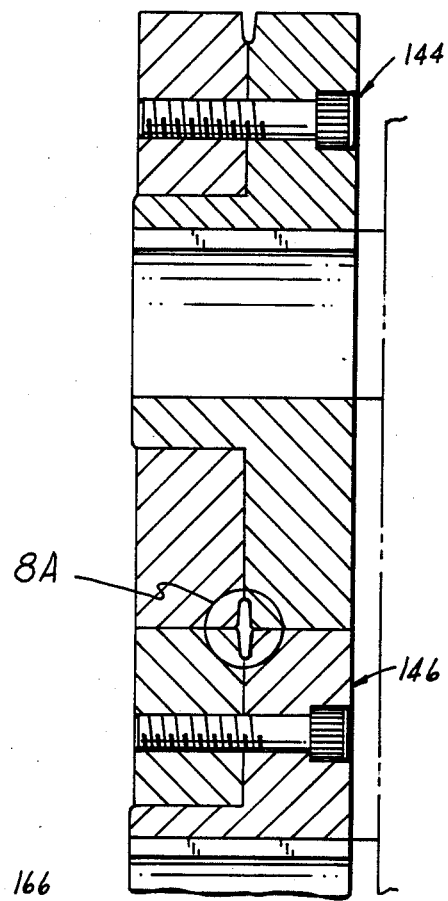
FIG. 8 is a sectional view taken along the line 8—8 in FIG. 2.
Figure 8A:
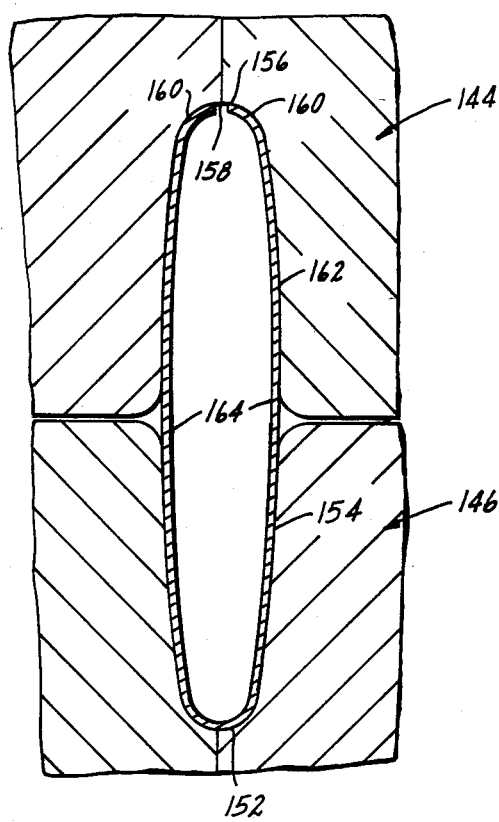
FIG. 8A is a fragmentary enlarged sectional view of the portion of FIG. 8 designated 8A.

The form rolls at station 5 are illustrated in FIGS. 8 and 8A, the upper roll being designated 144 and the lower roll being designated 146. The ring construction and assembly of these rolls is similar to rolls 122,124. Rolls 144,146 are keyed to parallel vertically spaced shafts 148,150 and, like rolls 122,124, are formed around their outer periphery with a central groove. The groove in the lower roll 146 is defined by an accurately centered rounded apex 152 having a radius the same as the rounded apex 130 on roll 124, but of an even greater circumferential extent, and side walls 154 which are curved to a lesser extent than the side walls 132 of roll 124. Likewise, the groove in the upper roll 144 is formed with a rounded apex 156 having a central cylindrical portion 158 of uniform radius and curved portions 160 having their same radius as the curved portions 138 on roll 122, but having a greater circumferential extent. Likewise, the side walls of the groove formed in the upper roll 144 are only slightly curved as indicated at 162. The side walls of the grooves in rolls 144,146 are spaced closer together than the side walls of the grooves in rolls 122,124 and the radial extent of these grooves is slightly greater than the corresponding grooves in rolls 122,124. Thus, the formed tube as it emerges from rolls 144,146 (FIG. 17) has its side walls 164 flatter and spaced closer together than the side walls 142 of the tube as formed by rolls 122,124 and the rounded opposite ends of the tube have a greater circumferential extent. It will be noted however that the grooves in rolls 144,146 are shaped and dimensioned such that the formed tube emerging from these rolls still has the extreme free edges 96 spaced apart slightly in opposed relation.

Figure 9:
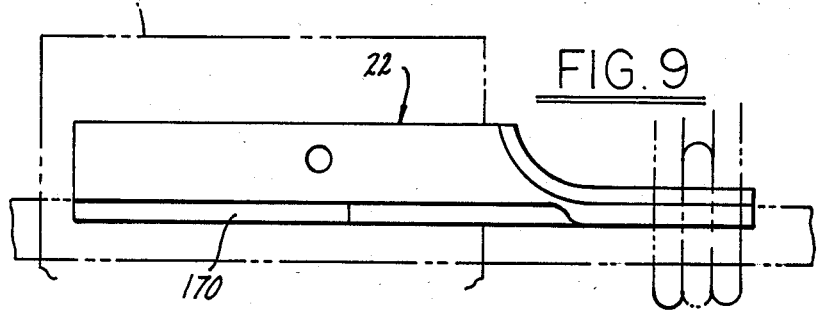
FIG. 9 is an enlarged side elevational view of the guide member.
Figure 11:
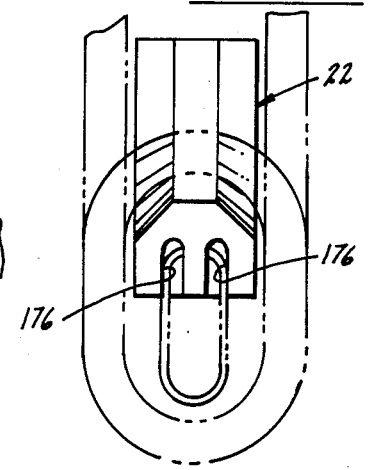
FIG. 11 is an end view of the guide member showing, in broken lines, the partially formed tube and the induction heater.
Figure 10:
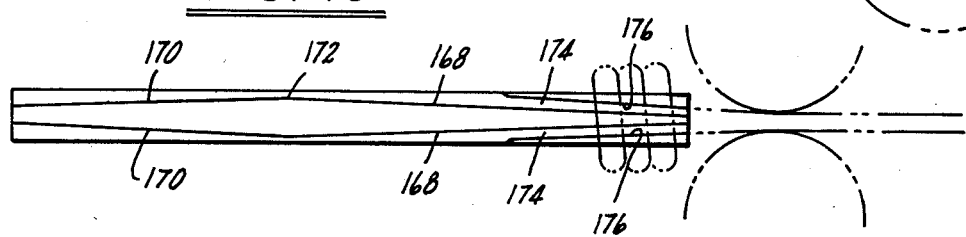
FIG. 10 is a bottom view of the guide member.

As the formed tube emerges from rolls 144,146, it is vertically supported and guided between the vertically spaced guide rolls 20. Roll 20 is located at the upstream end of guide 22. Referring to FIGS. 9 thru 11, guide 22 comprises a ceramic block of highly durable material mounted by suitable means on a fixed supporting bracket 166. The under side of guide 22 is formed with a pair of opposed guide tracks 168. At the upstream end of guide 22 the opposed side faces of the guide are machined to form a pair of vertical flat surfaces 170 which diverge in a downstream direction to a section designated 172 in FIG. 10. Thereafter, the flat vertical surfaces 170 converge in a downstream direction to the downstream end of the guide. The included angle between the converging portions of the flat surfaces 170 preferably lies in the range of 5° to 7°. Adjacent the downstream end of guide 22 the tracks 168 are formed as channels 174 of uniform width, the laterally inner faces of these channels being defined by the flat vertical faces 170 and the laterally outer faces of these channels being defined by flat vertical faces 176. As shown in FIG. 11, the width of each channel 174 corresponds accurately to the transverse dimension between the free edges 96 of the formed tube and the laterally outer face of the adjacent side wall 164 of the tube. Thus, as the formed tube is directed through guide 22, the curved edge portions 54 are first spread slightly apart and are then converged towards each other by the channels 176 so that each of these edges is closely confined laterally by the channels 174. In view of the fact that the side walls 164 are only slightly curved, it follows that these side walls are quite rigid in a vertical direction as viewed in FIG. 17. Since the bight portion 116 is accurately centered between the free ends 96, the two side walls have exactly the same vertical dimension. As a consequence, the two extreme free edges 96 of the tube are maintained in accurate horizontal alignment in slightly laterally spaced relation.

The downstream end of guide 22 and the portion of the tube being directed therethrough are encircled by the induction heating coil 24. This coil is water cooled and connected to a source of high frequency current so that as the tube advances therethrough the slightly spaced free edges 96 are immediately heated to a fusion temperature.

Immediately after emerging from the downstream end of guide 22 the tube is directed between the squeeze rolls 26 to produce a weld seam 186 between the fused edges 96. The details of squeeze rolls 26 are illustrated in FIG. 12. Each squeeze roll is journalled on a vertically extending shaft 178 and is cooled through a liquid conduit 180. Each squeeze roll 26 is formed around the outer periphery thereof with a recessed cylindrical portion 182 having annular rounded shoulders 184 around the upper and lower edges thereof. The radii of shoulders 184 correspond with the radii of the free edge portions 54 on the rounded strip and the rounded bight portion along the opposite longitudinal edge of the tube. The recessed cylindrical portion 182 has only a slight concave curvature, less than the curvature of the walls 164 imparted to the tube as it emerges from between rolls 144,146. The squeeze rolls are spaced apart such that, when the tube with the heated edges is directed therebetween, the side walls 164 are squeezed together and flattened to cause the free edges 96 to be brought into pressure engagement and thereby form the weld seam 186 (FIG. 18). Comparing FIGS. 17 and 18 it will be noted that the side walls 190 of the finished tube are generally flat and parallel. As a practical matter, the squeeze rolls 26 are shaped such that in a tube having a total vertical dimension of about ⅜" the side walls have a very slight, visually imperceptible curvature. The walls 190 are spaced apart at the vertically central portion thereof about 0.002" further than adjacent the rounded bight portions of the tube.

With the above described arrangement a perfectly formed tube with respect to the weld and the size and cross sectional shape of the tube, can be formed at the rate of 10 feet or more per second. The accuracy in the cross sectional shape of the tube and the soundness of the weld seam is attributable to several important features incorporated in the arrangement. In the first place, it will be noted that subsequent to the initial guides 18 and except for the short guide tracks 168, the free edges 96 of the strip are not subjected to frictional sliding engagement with other components and, particularly, with surfaces on the form rolls. This is extremely important because, in order to obtain a perfect weld seam at a high rate of speed, it is imperative that the edges to be welded remain perfectly flat and free of burrs or other surface roughness. In the above described arrangement the strip is accurately centered as it is directed between the successive form rolls by causing the form rolls to engage the laterally outer sides of the strip, particularly the laterally outer sides of the edge portions 54, rather than the free edges 96. In this manner perfect horizontal alignment of the abutting edges 96 is obtained and a minimum of cold working is imparted to the strip by rolling it in a manner such that the side walls of the tube remain substantially flat throughout the entire operation. Perfect alignment of the welded edges is also obtained by causing each of the free edge portions 54 to be laterally confined and gradually converged by the channels 174 in guide 22. It will be noted that the downstream end of guide 22 terminates immediately adjacent and on the upstream side of the two squeeze rolls 26. As mentioned previously, the included angle between the channels 174 preferably lies in the range of 5° to 7°. The squeeze rolls are positioned such that the converging straight inner sides 170 of these channels intersect approximately at the point where the two squeeze rolls cause the free edges 96 of the tube to be pressed together. In practice it has been found that when the included angle between channels 174 is about 5°, the downstream end of guide 22 can be located as close as ⅜" from a line connecting the axes of the two squeeze rolls 26. As a consequence, the free edges 96 are laterally confined in accurately aligned relation until just momentarily before they are welded together. In this manner a consistently sound weld seam is assured.

I claim:

1. In a mill for rolling flat metal strip of accurately uniform width into a tube having a pair of generally flat side walls connected along their opposite edges by rounded bight portions, the combination comprising: means at the upstream end of the mill for guiding the flat strip in an accurately straight path; a first pair of form rolls in said path downstream from and aligned with said guide means for bending the opposite longitudinal edge portions of the strip into similar upwardly curved edge portions while maintaining the portion of the strip between said edge portions in a flat condition; a second set of form rolls downstream from the first set, one roll of said second set having a peripheral V-shaped groove therein defined by a central rounded apex and opposed surfaces which flare radially outwardly from said apex and terminate in generally radially outwardly extending guide surfaces, the other roll in said second set having an axially central, radially outwardly extending annular rib with a rounded outer periphery in axial section which registers axially with the central rounded apex of said one roll and a pair of annular stop surfaces which extend axially to adjacent said guide surfaces; the axes of the rolls in the second set being spaced apart radially such that, when the strip is directed from between the first set of rolls to between the second set of rolls, the upwardly curved edge portions are engaged on the laterally outer sides thereof by said guide surfaces, the free edges of said curved surfaces are engaged by said stop surfaces and the central portion of the strip is engaged between said annular rib and the rounded apex to bend the strip transversely into a V-shaped cross section having a central rounded apex and upwardly oppositely inclined flat legs each terminating in laterally inwardly curved rounded portions, one or more additional sets of form rolls shaped to increase the circumferential extent of the rounded apex on the strip and decrease the included angle between said legs to an extent such that the free edges of said curved edge portions are displaced toward each other into close proximity in opposed relation, the last set of said additional form rolls being shaped such as to leave said free edges spaced apart slightly, and means downstream from said additional rolls for integrally joining said free edges together to form the finished tube, said last-mentioned means comprising means for heating said edge portions to fusion temperature and a pair of squeeze rolls arranged to bear with pressure engagement against the laterally opposite edges of the formed strip, said tube mill including guide means located intermediate said last set of form rolls and said squeeze rolls, said guide means comprising a pair of channels converging in a downstream direction, each channel having a pair of side walls spaced apart such as to engage each curved edge portion of the formed strip on laterally opposite sides thereof.

2. A tube mill as called for in claim 1 wherein said channels are straight.

3. A tube mill as called for in claim 1 wherein the downstream ends of said channels are disposed closely adjacent the location where the squeeze rolls engage the formed strip.

4. A tube mill as called for in claim 3 including an induction heating coil for heating said free edges of the strip, said coil encircling said guide means.

5. A tube mill as called for in claim 3 wherein the included angle between the channels is determined so that the free edges of said opposite edge portions intersect at approximately the location where the squeeze rollers engage the formed strip.

6. A tube mill as called for in claim 5 wherein the included angle between said channels is between about 5° to 7°.

7. In a mill for rolling flat metal strip of accurately uniform width into a tube having a pair of generally flat side walls connected along their opposite edges by rounded bight portions, the combination comprising: a plurality of successive sets of form rolls for progressively bending the flat strip into the approximate shape of the finished tube and to a configuration wherein the free edge portions of the strip are similarly rounded and spaced slightly apart; means downstream from the last set of said form rolls for heating said edge portions to a fusion temperature and a pair of laterally spaced squeeze rolls adapted to bear against the laterally opposite sides of the formed strip and squeeze said edges together to form a weld seam therebetween and means for accurately guiding the formed strip from the last set of form rolls to between said squeeze rolls, said guide means comprising a pair of channels which converge in a downstream direction, each channel being dimensioned to engage each rounded edge portion of the strip on laterally opposite sides thereof and thereby accurately guide the strip as it advances from said last set of form rolls to between said squeeze rolls.

8. A tube mill as called for in claim 7 wherein each of said channels is straight.

9. A tube mill as called for in claim 7 wherein the downstream ends of said channels are disposed closely adjacent the location where the squeeze rolls engage the formed strip.

10. A tube mill as called for in claim 9 wherein the included angle between the channels is determined so that the laterally inner sides of the channels intersect at approximately the location where the squeeze rollers engage the formed strip.

11. A tube mill as called for in claim 7 wherein said heating means comprises an induction heating coil encircling said guide means.

* * * * *